United States Patent Office 2,785,148
Patented Mar. 12, 1957

2,785,148

MANUFACTURE OF RESINS FROM 2,3,4,5-BIS($\Delta^2$-BUTENYLENE)-TETRAHYDROFURFURAL

John C. Hillyer and James T. Edmonds, Bartlesville, Okla., assignors to Phillips Petroleum Company, a corporation of Delaware No Drawing. Application January 3, 1952, Serial No. 264,836

18 Claims. (Cl. 260—67)

This invention relates to a process for the production of resins. In one aspect this invention relates to the conversion of 2,3,4,5-bis($\Delta^2$-butenylene)-tetrahydrofurfural to thermoplastic resins. In still another aspect this invention relates to the utilization of selected concentrates containing 2,3,4,5-bis($\Delta^2$butenylene)-tetrahydrofurfural recovered from furfural employed as a selective solvent in the extraction distillation of $C_4$ hydrocarbon mixtures containing butenes and butadienes, in the preparation of thermoplastic resins. In still another aspect this invention relates to novel thermoplastic resins as new compositions.

2,3,4,5-bis($\Delta^2$-butenylene)-tetrahydrofurfural, is illustrated alternatively by the structural formula

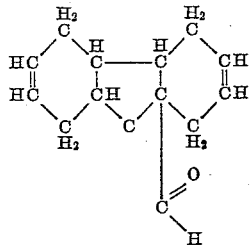

This compound is a nearly water-white liquid having a boiling point of about 550° F. (corrected), a specific gravity, $$d_{20}^{20}$$

of about 1.120, and refractive index $n_D^{20}$ of about 1.5240 and an iodine number of 253. It is insoluble in water, ethylene glycol, dilute aqueous sodium hydroxide and dilute hydrochloric acid. It is soluble in acetone, benzene, carbon tetrachloride, ethanol, isooctane, vinylcyclohexene, isopentane, ethyl ether, toluene and n-hexane.

One method for the production of 2,3,4,5-bis($\Delta^2$-butenylene)-tetrahydrofurfural comprises the inter-reaction of 1,3-butadiene with furfural at a temperature of from 200° F. to 300° F. for from 5 to 100 hours under sufficient pressure to maintain the reactants in liquid phase. This and other suitable conditions and methods for making the compound are disclosed in the copending application of J. C. Hillyer and D. A. Nicewander, Serial No. 81,413, filed March 14, 1949, now Patent No. 2,683,151, July 6, 1954.

2,3,4,5-bis($\Delta^2$-butenylene)-tetrahydrofurfural can be obtained as a by-product of an extractive distillation process involving the use of furfural as a selective solvent in the separation of butadiene from a butadiene-butene hydrocarbon mixture undergoing fractional distillation in a distillation column. In such a process the butadiene-butene stream is contacted with furfural generally containing from 4–6 percent water. Temperatures in various parts of the extractive distillation system range up to about 325° F., and the total contact time of butadiene and furfural in the extractive distillation column is sufficiently long to provide for some appreciable "side reaction," or condensation, of furfural with butadiene, and the concomitant formation of some 2,3,4,5-bis-($\Delta^2$-butenylene) - tetrahydrofurfural by-product. The magnitude of such extractive distillation operations is such that large volumes of furfural are in constant circulation in the system, and thus even a low conversion of furfural to the 2,3,4,5-bis($\Delta^2$-butenylene)-tetrahydrofurfural provides large amounts of 2,3,4,5-bis($\Delta^2$-butenylene)-tetrahydrofurfural that can be utilized as a starting material in the process of our invention. In such a rerun system the 2,3,4,5,-bis($^2\Delta$-butenylene)-tetrahydrofurfural (by-product of furfural-butadiene reaction) is separated from the furfural, as a part of a tarry bottoms product, containing large amounts of resinous furfural polymer together with certain lactone products of furfural-water-butadiene reaction. Separation of the 2,3,4,5-bis($\Delta^2$-butenylene) - tetrahydrofurfural by-product from the tar can be effected by high-vacuum distillation. However, the tarry material itself can be employed as a starting material in the process of our invention. Exemplary of such tarry materials is one having a density of about 1.20 grams per cc., an acid number of about 15 mg. of KOH per gram of sample, and a bromine number (carbontetrachloride) of about 120–125. Such a tarry material often contains about 10 percent occluded water and less than 1 percent of furfural, on a weight basis. Such a tarry material contains often about 10 to about 15 weight percent of 2,3,4,5-bis($\Delta^2$-butenylene)-tetrahydrofurfural.

According to our invention we have provided for the production of novel thermoplastic resins from 2,3,4,5-bis($\Delta^2$-butenylene)-tetrahydrofurfural, by heating the same at a temperature within the range 190–600° F. for a period of from about 5–150 hours. Still, according to the invention, air-blowing of the aldehyde can be practiced. When air-blowing is practiced the temperature will be about 190–390° F. and the time will be about 5–100 hours.

When converting 2,3,4,5-bis($\Delta^2$-butenylene)-tetrahydrofurfural to the novel resins of this invention, by heating alone, we generally employ a temperature in the range of 300–600° F., preferably 350–450° F. Often we prefer to react the 2,3,4,5-bis($\Delta^2$-butenylene)-tetrahydrofurfural starting material while heating same under refluxing temperatures, at about atmospheric pressure, or higher pressures if desired. When employing a tarry material recovered from furfural as described above, as our starting material, we prefer to employ a temperature within the range of 300–450° F., more preferably in the range of about 330–375° F.

When air-blowing the aldehyde reactant, we prefer a temperature in the range of 190–390° F., preferably 250–350° F.

In carrying out the various embodiments of our process, we generally prefer to operate at about atmospheric pressure, although higher operating pressures can be employed if desired.

When producing the resins of this invention by heating the 2,3,4,5-bis($\Delta^2$butenylene) - tetrahydrofurfural reactant, alone, a reaction time of about 10–150 hours is employed, or longer if desired, a preferred reaction time being in the range of about 50 to about 150 hours. When employing air-blowing, a treating period in the range of about 5–100 hours is generally employed.

In various instances it is advantageous to conduct the air-blowing step of our invention in the presence of a suitable catalyst. Suitable catalytic materials which are applicable to this embodiment (air-blowing) include iron naphthenate, cobalt naphthenate, manganous acetate, manganese acetate, manganese naphthenate, manganese-2-ethyl hexoate and the like. The amount of catalyst employed will be small; from 0.1 to 5 weight percent based on the starting material can be employed with from 0.5 to 2 percent being preferred.

When air-blowing, as described above, oxygen or suitable oxygen-containing gases such as, for example, air, may be employed. The amount of oxygen employed can be varied over a wide range. When using an oxygen-containing gas such as air, an amount thereof sufficient to provide from 25 to 250 volumes of oxygen per volume of starting material per hour will be adequate.

In carrying out one embodiment of the process of our invention, 2,3,4,5-bis($\Delta^2$-butenylene)-tetrahydrofurfural is heated at a temperature in the range of 250–350° F. while at the same time passing oxygen of commercial grade purity, i. e. about 90% or higher, or air, through the reactant material thus heated, for a period of from about 5–100 hours, at about atmospheric pressure.

In one form, this embodiment can be carried out by passing the oxygen-containing gas through the reactant material maintained under reflux. Although a catalyst is not necessary in carrying out this embodiment such a catalyst as already described can be employed if desired. A tarry by-product material, containing 2,3,4,5-bis($\Delta^2$-butenylene)-tetrahydrofurfural, of the type described above, can be employed as a starting material in this embodiment.

In one form of the embodiment of our invention wherein our resins are prepared by heating the aldehyde reactant alone, i. e. without air blowing 2,3,4,5-bis($\Delta^2$-butenylene)-tetrahydrofurfural, or a tarry material of the type described above containing 2,3,4,5-bis($\Delta^2$-butenylene)-tetrahydrofurfural, is heated, often conveniently under refluxing conditions at about atmospheric pressure for a period of from 50–150 hours at a temperature in the preferred range of 350–450° F., after which time a thermoplastic resin product of the process is recovered from the resulting reaction mixture.

Our invention is illustrated by the following examples.

Example I 2,3,4,5-bis($\Delta^2$-butenylene)-tetrahydrofurfural was heated under refluxing conditions at 392° F. for 55½ hours. Removal of the unpolymerized starting material by vacuum distillation provided a thermoplastic resin which had a softening point of 170° F. (Ball & Ring Method). The resin was amber in color. It was not visibly attacked by 24 hour exposure to 10% aqueous sodium hydroxide and was insoluble in isooctane. It was partially soluble in ethanol and was completely soluble in acetone. It was immediately attacked by concentrated sulfuric acid. The yield of resin based on 2,3,4,5-bis($\Delta^2$-butenylene)-tetrahydrofurfural was 31.2 weight percent.

Example II 199 grams of 2,3,4,5-bis($\Delta^2$-butenylene)-tetrahydrofurfural was heated at 400° F. for 142 hours at atmospheric pressure under refluxing conditions. At the end of the heating period, unchanged starting material was removed by vacuum distillation to provide 59.5 grams of a red-brown thermoplastic resin.

Example III

A tarry residue, containing 2,3,4,5-bis($\Delta^2$-butenylene)-tetrahydrofurfural, recovered from furfural previously employed as a selective solvent in the extractive distillation of a $C_4$ hydrocarbon mixture containing butenes and butadiene, was heated under reflux at 392° F. for 46 hours. A black thermoplastic resin was obtained which had a softening point (Ball & Ring Method) of 167° F. The resin was not visibly attacked by 10% aqueous NaOH and was insoluble in isooctane. It was partially soluble in ethanol and was soluble, except for a small residue in acetone. The resin was immediately attacked by concentrated $H_2SO_4$. The yield of resin based on starting material was 90.4 percent.

Properties of the resin are compared with the properties of the starting material in the following tabulations:

| | Resin | Starting Material |
|---|---|---|
| Softening Point | 167° F. | 77° F. |
| Solubility in— | | |
| Isooctane | Insoluble | Partially. |
| Ethanol | Partially | Soluble except for small residues. |
| Acetone | Soluble except for small residues. | Do. |
| Effect of— | | |
| 10% aqueous NaOH, 24 hours. | No visible attack | |
| Concentrated $H_2SO_4$ | Immediate attack | |

Example IV 45.5 grams of 2,3,4,5-bis($\Delta^2$-butenylene)-tetrahydrofurfural was charged to a flask equipped with a reflux condenser and heated to 302° F. Air was then bubbled through the charge at a rate of approximately 1 cubic foot per hour for a period of 93 hours. At the end of the "air-blowing" the contents of the flask were black, and upon cooling to room temperature were very viscous. Distillation of the reaction effluent at 392° F. and 1 mm. pressure provided a black, hard, thermoplastic resin. The yield of resin based on starting material was 60.4 weight percent.

In a comparative run 46.5 grams of 2,3,4,5-bis($\Delta^2$-butenylene)-tetrahydrofurfural was treated under the same conditions described above except that nitrogen was employed instead of air. At the end of the "blowing" the contents of the flask were still clear and substantially unchanged. Distillation of the reaction effluent at 392° F. provided a small amount of light yellow fluid residue. The amount of residue based on starting material was 7.0 weight percent.

Example V

A run was made according to the procedure of Example IV wherein 73.3 grams of 2,3,4,5-bis($\Delta^2$-butenylene)-tetrahydrofurfural and 0.7 gram of manganese naphthenate in admixture therewith was heated to 302° F. and air-blown for 40 hours under total reflux conditions. At the end of the treating period the contents of the flask were black, and upon cooling to room temperature were very viscous. Distillation of the reaction effluent at 392° F. and 1 mm. provided a black, hard, thermoplastic resin. The yield of resin based on the starting material was 33.6 weight percent.

Based on the first run of Example IV, the present run represents 55.7 percent of the production of said run in 40 percent of the processing time.

Example VI

This example illustrates the preparation of a thermoplastic resin from tarry materials containing 2,3,4,5-bis($\Delta^2$-butenylene)-tetrahydrofurfural. The tarry material employed was a polymeric residue obtained from a furfural sidestream drawn from an extractive distillation system employing furfural as a selective solvent in the recovery of 1,3-butadiene from a $C_4$ hydrocarbon mixture. This polymeric residue was a brownish-black tarry material substantially completely insoluble in water, (about 5 percent being dissolved on prolonged contact with water), and contained about 10 percent occluded water and less than 1 percent unreacted furfural; it had a density of 1.20 grams per cc., an acid number of 15 (mg. KOH/gm. sample), and a bromine number, in $CCl_4$, of 122.3. This polymeric residue contained about 15 percent 2,3,4,5-bis($\Delta^2$-butenylene)-tetrahydrofurfural.

68.3 grams of the material just described was placed in a round-bottomed flask fitted with an air condenser and connected in series to an ice-cooled trap and then to a Dry Ice trap. The polymer was heated to 293–311° F. and air was bubbled therethrough for 18 hours. The softening point of the original material was 77° F. and the softening point of the resin produced therefrom was 158° F. The yield of resin based on starting material was 84.0 percent.

7.9 gms. of water and 3 gms. of water insoluble liquid was collected in the off-gas traps. The water collected was present in the starting material and no detectable amount was formed during air-blowing.

*Example VII*

104.24 grams of tarry material containing 2,3,4,5-bis($\Delta^2$-butenylene)-tetrahydrofurfural, described in the preceding example was placed in a round-bottomed flask fitted with a water-cooled condenser connected to an ice-cooled trap. The material was heated to 293–311° F. and dry air was bubbled therethrough for 18 hours. The softening point of the original material was 77° F.; softening point of the resin produced therefrom was 122° F. The yield of resin based on original material was 91.0 weight percent.

9.04 gms. of water was collected from the overhead gas stream. The water collected was present in the starting material and no detectable amount was formed during air blowing.

In any of the embodiments of our process, the particular range of temperature and the length of heating period employed, will depend upon the selection of the starting material and upon the properties, such as hardness and softening point, desired in the resin produced therefrom.

Reasonable variation and modification are possible within the scope of the foregoing disclosure and the appended claims to the invention, the essence of which is the production of novel thermoplastic resins by heating 2,3,4,5-bis($\Delta^2$-butenylene)-tetrahydrofurfural at a temperature within the range of 190–600° F. for a period of 5–150 hours, now preferred embodiments being (1) heating the said 2,3,4,5-bis($\Delta^2$-butenylene)-tetrahydrofurfural, alone, at 300–600° F. for 10–150 hours, (2) contacting the said 2,3,4,5-bis($\Delta^2$-butenylene)-tetrahydrofurfural with an oxygen-containing gas at a temperature within the range of 190–390° F. for 5–100 hours, employing a catalyst under conditions and in a manner as described above, and (3) employing as the said 2,3,4,5-bis($\Delta^2$-butenylene)-tetrahydrofurfural reactant in either of these embodiments a tarry residue containing 2,3,4,5-bis($\Delta^2$-butenylene)-tetrahydrofurfural and recovered from furfural, previously employed as a selective solvent in the extractive distillation of a $C_4$ hydrocarbon mixture containing butadiene; and, said novel resins.

The novel resins of our invention are thermoplastic. They are resistant to the action of common solvents such as hydrocarbons boiling in the gasoline range, and they are resistant to the action of aqueous alkalies. The resins of the present invention have many potential uses such as for sealing dry cell batteries, for electrical insulating applications and the like. They are usable as rubber substitutes and in general for molded articles of a wide variety of forms and shapes which are resistant to wear and corrosion. These resins have softening points above about 113° F.

In this specification and in the claims the volumes of gas (i. e., air, oxygen, etc.) are measured at standard temperature and pressure.

We claim:

1. A process for producing a thermoplastic resin comprising heating a reactant material consisting essentially of one selected from the group consisting of 2,3,4,5-bis($\Delta^2$-butenylene)-tetrahydrofurfural and a tarry residue containing 2,3,4,5-bis($\Delta^2$-butenylene)-tetrahydrofurfural, the said tarry residue having been recovered, without removal of 2,3,4,5-bis($\Delta^2$-butenylene)-tetrahydrofurfural found in the said tarry residue, as by-product formed during extractive distillation of a $C_4$ hydrocarbon mixture containing butadiene employing furfural as the selective solvent, at a temperature within the range of 190–600° F., until a resin is formed and for a period of from 5–150 hours, effecting said heating of said tarry residue under at least atmospheric pressure and under conditions retentive of 2,3,4,5-bis($\Delta^2$-butenylene)-tetrahydrofurfural, and recovering said resin as a product of the process.

2. The process of claim 1 wherein an oxygen-containing gas is passed in contact with said reactant material in an amount sufficient to provide from 25–250 volumes of oxygen per volume of said reactant material per hour, at a temperature of 190–390° F.

3. The process of claim 1 wherein said reactant material is maintained under reflux at a temperature within the range of 350–450° F. for a period of 50–150 hours.

4. The process of claim 1 wherein an oxygen-containing gas is passed through said reactant material while maintained under reflux, at a temperature within the range of 190–390° F.

5. The process of claim 1 wherein said material is heated in the presence of oxygen at a temperature within the range of 190–390° F., for a period of 5–100 hours.

6. The process of claim 1 wherein said temperature is within the range of 300–450° F.

7. A thermoplastic resin formed by heating a reactant material consisting essentially of one selected from the group consisting of 2,3,4,5-bis($\Delta^2$-butenylene)-tetrahydrofurfural and a tarry residue containing 2,3,4,5-bis($\Delta^2$-butenylene)-tetrahydrofurfural, at a temperature within the range of 190–600° F. until a resin is formed and for a period of from 5 to 150 hours, the said tarry residue having been recovered, without removal of 2,3,4,5-bis($\Delta^2$-butenylene)-tetrahydrofurfural found in the said tarry residue, as by-product formed during extractive distillation of a $C_4$ hydrocarbon mixture containing butadiene employing furfural as the selective solvent, said heating of said tarry residue being effected under at least atmospheric pressure and under conditions retentive of 2,3,4,5-bis($\Delta^2$-butenylene)-tetrahydrofurfural.

8. A resin product of claim 7 formed at a temperature within the range of 190–390° F., in the presence of oxygen.

9. A resin product of claim 7 formed by heating said tarry residue at a temperature within the range of 300–450° F.

10. A thermoplastic resin of claim 7, produced by contacting an oxygen-containing gas with said reactant material while maintained at a temperature within the range of 250–350° F. for a period of from 5–100 hours.

11. A process for producing a thermoplastic resin comprising heating 2,3,4,5-bis($\Delta^2$-butenylene)-tetrahydrofurfural at a temperature within the range of 250–350° F. in the presence of a catalyst while passing an oxygen-containing gas in contact with said 2,3,4,5-bis($\Delta^2$-butenylene)-tetrahydrofurfural in an amount to provide from 25–250 volumes of oxygen per volume of said 2,3,4,5-bis-($\Delta^2$-butenylene)-tetrahydrofurfural per hour, and recovering said resin as a product of the process.

12. The process of claim 11 wherein said catalyst is manganese naphthenate, and said oxygen-containing gas is air.

13. A process for producing a thermoplastic resin comprising heating a material consisting essentially of 2,3,4,5-bis($\Delta^2$-butenylene)-tetrahydrofurfural at a temperature within the range of 300–600° F. for a period of from 5–150 hours, and recovering said resin from the resulting reaction mixture as a product of the process.

14. A thermoplastic resin product formed by heating a material consisting essentially of 2,3,4,5-bis($\Delta^2$-butenylene)-tetrahydrofurfural at a temperature within the range of 300–600° F., for a period of 5–150 hours.

15. A process for producing a thermoplastic resin comprising heating a reactant material consisting essentially of a tarry residue containing organic reaction products of butadiene and furfural in a mole ratio of 2 to 1, the said tarry residue having been recovered without removal of any of such organic reaction products found in the said tarry residue, as a by-product formed during extractive distillation of a C⁴ hydrocarbon mixture containing butadiene employing furfural as the selective co-solvent, at a temperature of about 400° F., until a resin is formed of ball and ring softening point of at least about 160° F., effecting said heating of said tarry residue under atmospheric pressure and under conditions retentive of the said organic reaction products of butadiene and furfural and recovering said resin as a product of the process.

16. The process for producing a thermoplastic resin comprising heating at a temperature within the range of 190-600° F. for a period of from 5-150 hours, a non-resinous organic reaction product of butadiene and furfural, obtained by the inter-reaction of 1,3-butadiene with furfural in a mol ratio of 2:1 at a temperature of from 200° F. to 300° F. for from 5 to 100 hours under sufficient pressure to maintain the reactants in liquid phase, and containing 2,3,4,5-bis($\Delta^2$-butenylene)-tetrahydrofurfural, and recovering said resin from the resulting reaction mixture as a product of the process.

17. A thermoplastic resin product formed by heating at a temperature within the range of 190-600° F. for a period of 5-150 hours a non-resinous organic reaction product of butadiene and furfural obtained by the inter-reaction of 1,3-butadiene with furfural in a mol ratio of 2:1 at a temperature of from 200° F. to 300° F. for from 5 to 100 hours under sufficient pressure to maintain the reactants in liquid phase, and containing 2,3,4,5-bis($\Delta^2$-butenylene)-tetrahydrofurfural.

18. A process for producing a thermoplastic resin comprising heating a reactant material consisting essentially of a tarry residue containing organic reaction products of butadiene and furfural in a mol ratio of 2:1, the said tarry residue having been recovered, without substantial removal of such organic reaction products found in the said tarry residue, as a by-product formed during extractive distillation of a C⁴ hydrocarbon mixture containing butadiene employing furfural as the selective solvent, at a temperature of about 400° F. to about 500° F., until a resin is formed of ball and ring softening point of at least about 160° F., effecting said heating of said tarry residue under atmospheric pressure and under conditions retentive of the said organic reaction products of butadiene and furfural and recovering said resin as a product of the process.

References Cited in the file of this patent
UNITED STATES PATENTS 2,483,903   Herbolsheimer _____ Oct. 4, 1949

OTHER REFERENCES

Hillyer Ind. and Eng. Chem., Nov. 1948. Pages 2216-2220.